Jan. 2, 1923.
C. J. BROWN.
BAIT.
FILED DEC. 27, 1921.
1,441,059.
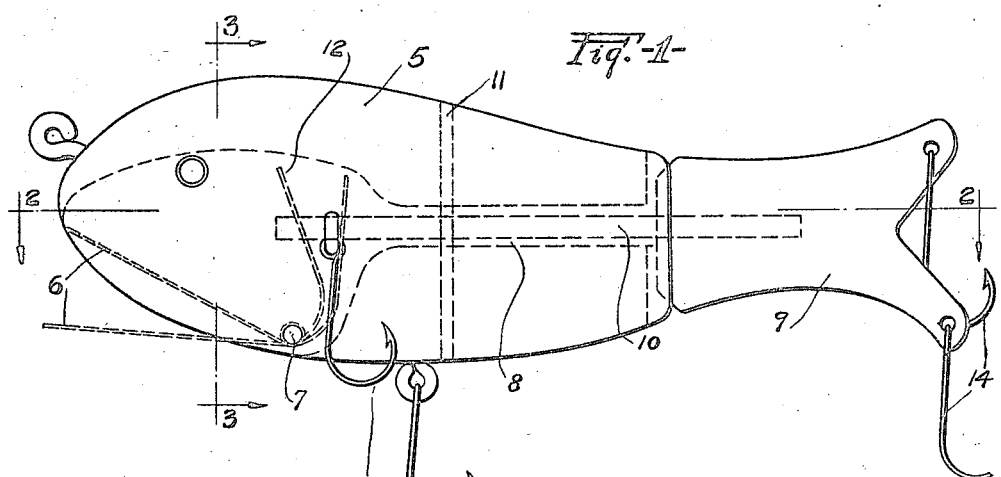
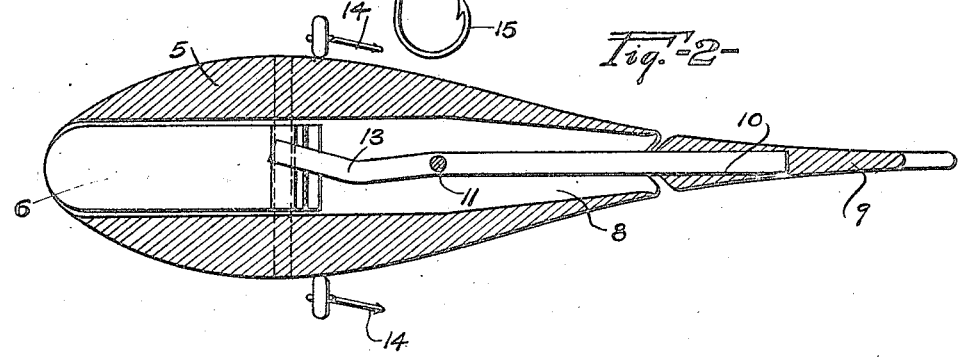
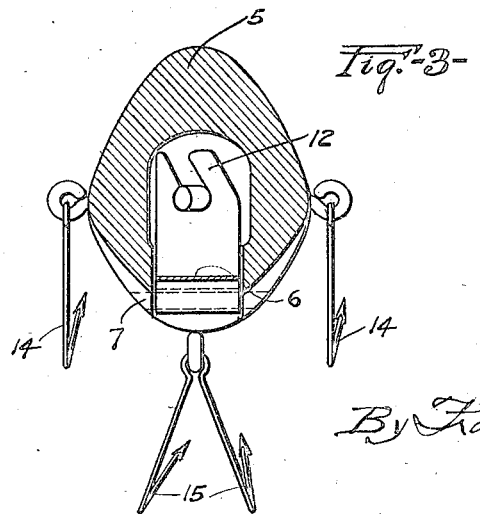
Inventor:
Clarence J. Brown.
By Frank D. Thomason
Attorney.

Patented Jan. 2, 1923.

1,441,059

UNITED STATES PATENT OFFICE.

CLARENCE J. BROWN, OF CHICAGO, ILLINOIS.

BAIT.

Application filed December 27, 1921. Serial No. 524,816.

*To all whom it may concern:*

Be it known that I, CLARENCE J. BROWN, a citizen of the United States, residing at Chicago, in the county of Cook and State of Illinois, have invented certain new and useful Improvements in Bait, of which the following is a full, clear, and exact description.

My invention relates to fish bait and particularly to the construction of artificial fish bait. The object of my invention is to give the bait a natural movement that will deceive the fish, and thus facilitate the excitement of the piscatorial art. This I accomplish by the means hereinafter fully described, and as particularly set forth in the claims.

In the drawings:

Figure 1 is a side view of my invention drawn to an exaggerated scale.

Figure 2 is a horizontal section through the same.

Figure 3 is a cross-section taken on dotted line 3—3, Figure 1, looking in the direction of the arrows.

Referring to the drawings 5, represents the body of a wooden fish which is provided with a longitudinal bore and which has the lower jaw removed and replaced by a straight jaw or tongue, 6, preferably, made of sheet metal, and pivoted at the rear end of the head on a transverse pin 7. The vertical edges of the bore 8 at its rear end, are countersunk, and the tail 9, is secured to the rear end of a rod 10, that may consist of a piece of round wire or may be made flat and arranged vertically. This rod is pivoted by a vertical pin 11, at a point about one half of an inch to the rear of the pivot of jaw 6, and its forward end 13 in front of this pivot is bent sidewise or obliquely for a short distance.

The jaw 6, extends to the rear of its pivot and vertically to form a bifurcated extension 12, and the forward oblique end 13 of the rod 10 (to the rear end of which the tail is attached) passes between these bifurcations. The rush of water, when the bait is being used to troll with, or when casting, or when the bait is moved forward, will push the jaw, 6, upwards and downwards as it flows through the bore of the bait, and when it does this the extension of the jaw will rock forward and rearward and engage the oblique forward end of the rod 10 and move the rod sidewise to the extent of the rear opening of the bore.

From the outside the appearance of the movement of the jaw 6, and the slight wiggle of the tail, gives the bait a very natural movement, that attracts the larger fish and induces them to strike at the bait. The bait has a number of hooks 14 and 15, attached to it about midway the length of the body and to the tail, and when the fish strike at this bait its mouth becomes entangled with and is caught by the hooks, from which the fish can be removed in the usual manner.

What I claim as new is:

1. A fish-bait consisting of a fish-body that is hollow throughout its length including the space occupied by the jaw, a jaw inserted in said space and pivoted at its rear end, and a tail at the rear end of the body and means whereby the tail is given a lateral oscillatory motion by said jaw.

2. A fish-bait consisting of a fish-body that is hollow throughout its length including the space occupied by the jaw, a jaw inserted in said space and pivoted at its rear end, a tail at the rear end of the body, and a rod to which said tail is secured that is pivoted on a vertical axis within said body and has its forward end engaged and moved laterally by said jaw.

3. A fish-bait consisting of a fish-body that is hollow throughout its length including the space occupied by the jaw, a jaw inserted in said space pivoted on a horizontal axis at its rear end and having an upwardly extending bifurcated extension from said pivot, a tail at the rear end of the body, and a rod to which said tail is secured that is pivoted on a vertical axis within said body and has its forward end bent obliquely and extended between the bifurcations of the extension of the jaw.

In witness whereof I have hereunto set my hand and seal this 13th day of December, 1921.

CLARENCE J. BROWN.

Witnesses:
 FRANK D. THOMASON,
 VIOLET WARDELL.